J. PFEIFER.

Handle.

No. 8,946. Reissued Oct. 28, 1879.

Attests

R. S. Chieck

Inventor

John Pfeifer
by his atty.
Francis L. Chambers

N. PETERS, PHOTO-LITHOGRAPHER, WASHINGTON, D. C.

UNITED STATES PATENT OFFICE.

JOHN PFEIFER, OF PHILADELPHIA, PENNSYLVANIA.

IMPROVEMENT IN HANDLES.

Specification forming part of Letters Patent No. 57,759, dated September 4, 1866; Reissue No. 8,946, dated October 28, 1879; application filed September 13, 1879.

*To all whom it may concern:*

Be it known that I, JOHN PFEIFER, of Philadelphia, in the county of Philadelphia and State of Pennsylvania, have invented new and useful Improvements in Handles; and I do hereby declare that the following is a full and exact description thereof, reference being had to the accompanying drawings, making part of this specification—

Figure 1:
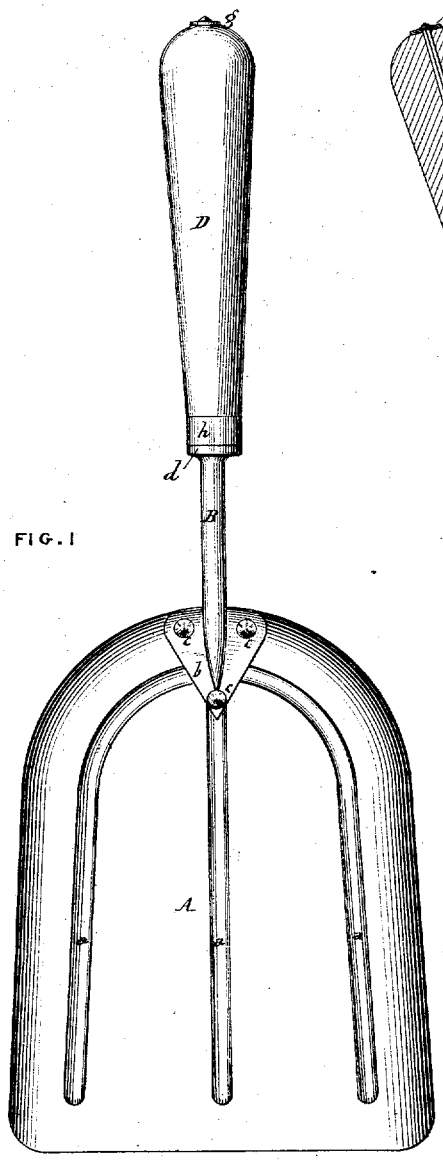
Figure 2:
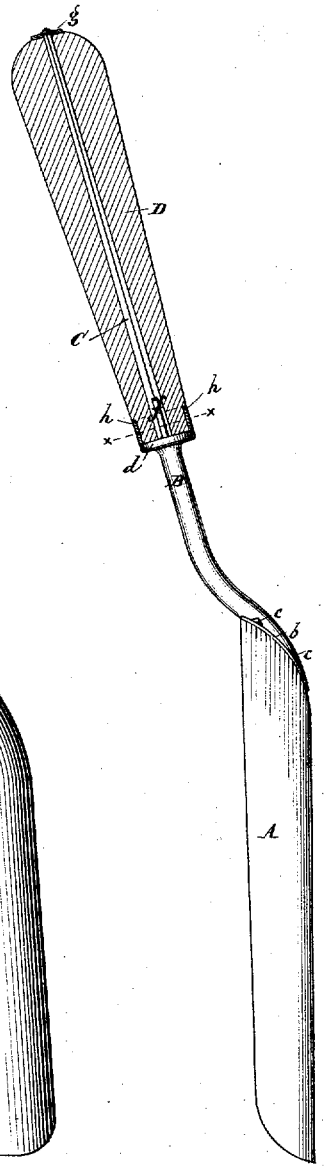
Figure 3:
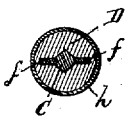

Figure 1 being a view of a coal-shovel having my improved handle. Fig. 2 is a side view thereof, with a central longitudinal section of the wooden handle; Fig. 3, a transverse section of the handle in a plane indicated by the line *x x*, Fig. 2.

Like letters of reference correspond to like parts in all of the figures.

Wooden handles, which, on account of their non-conductibility, it has been found advisable to attach to metallic articles subjected to heat, have been found objectionable, for the reason that they are apt to char and shrink at their points of attachment to the metal, and thereby fall off or become so loose as to be useless.

The object of my invention is the attachment of wooden handles to metallic necks exposed to heat in such a way that the above defects shall be overcome. This I accomplish by making the metallic neck B of my improved handle with a shoulder, *d*, for the wooden handle D to abut against, which shoulder has projections or vanes *f f*, which project into the wooden handle D, which is held against the shoulder *d* by means of the spindle C, which passes through the wooden handle and is secured at its top above a metallic plate by riveting or any of the ordinary methods, as shown at *g*.

While the clamping of the handle between the shoulder and plate keeps said handle from falling off, the vanes *f f* keep it steady and prevent it turning on the shank.

While spindles of a square cross-section have been commonly used to give rigidity to wooden handles, they are useless and harmful where the metal is exposed to heat, for they soon char the surrounding wood and become loose; and if large enough to retain some gripe upon the wood, they will warp and split it at the corners of the spindle, where the section of the wood is necessarily smallest.

What I claim as my invention, and desire to secure by Letters Patent, is—

1. The handle with the metallic neck B, shoulder *d*, and vanes *f f*, in combination with the wooden handle D, substantially as and for the purpose herein specified.

2. A wooden handle, D, secured between a shoulder, *d*, and a metallic plate at top, in combination with projections or vanes *f f*, substantially as shown, and for the purpose specified.

3. A wooden handle secured to the neck and shoulder by a shank passing through it, and prevented from turning upon said shank by means of projections or vanes *f f*, constructed substantially as and for the purpose specified.

JOHN PFEIFER.

Witnesses:

R. S. CHILD, Jr.,

JOHN R. BENNETT.